United States Patent [19]

Logsdon

[11] 3,901,275
[45] Aug. 26, 1975

[54] COMPACT CONTROL UNIT FOR AIR DISTRIBUTING SYSTEMS

[75] Inventor: Hillard Glenn Logsdon, Charlotte, N.C.

[73] Assignee: Aeronca, Inc., Pineville, N.C.

[22] Filed: Feb. 1, 1974

[21] Appl. No.: 438,572

[52] U.S. Cl. ............... 137/601; 98/38 B; 137/607
[51] Int. Cl. ........................................ F16k 19/00
[58] Field of Search...98/38, 38 A, 38 B, 38B1, 98/38 B2, 38 E; 137/601, 607; 236/13

[56] References Cited
UNITED STATES PATENTS

| | | | |
|---|---|---|---|
| 2,880,752 | 4/1959 | Kreuttner | 137/607 X |
| 2,891,576 | 6/1959 | Kennedy | 137/601 X |
| 2,906,287 | 9/1959 | Kreuttner | 98/38 B X |
| 3,053,454 | 9/1962 | Waterfill | 98/38 B X |
| 3,363,534 | 1/1968 | Spradling | 98/38 B1 |

Primary Examiner—Robert G. Nilson
Attorney, Agent, or Firm—Parrott, Bell, Seltzer, Park & Gibson

[57] ABSTRACT

A compact air flow control unit comprising an air mixing valve, a duct and a volume regulator successively arranged within a housing for the flow of air therethrough. The air mixing valve is secured to and supported by the air ingress end wall of the housing, to in turn, support the duct and the air volume regulator interconnected therewith in out of contact relation with opposing pairs of side walls of the housing so as to provide a compact arrangement of the components of the control unit and also to dampen vibrations produced during the flow of air through the volume regulator so as to reduce the transmittal of noises created thereby to the housing of the control unit.

6 Claims, 4 Drawing Figures

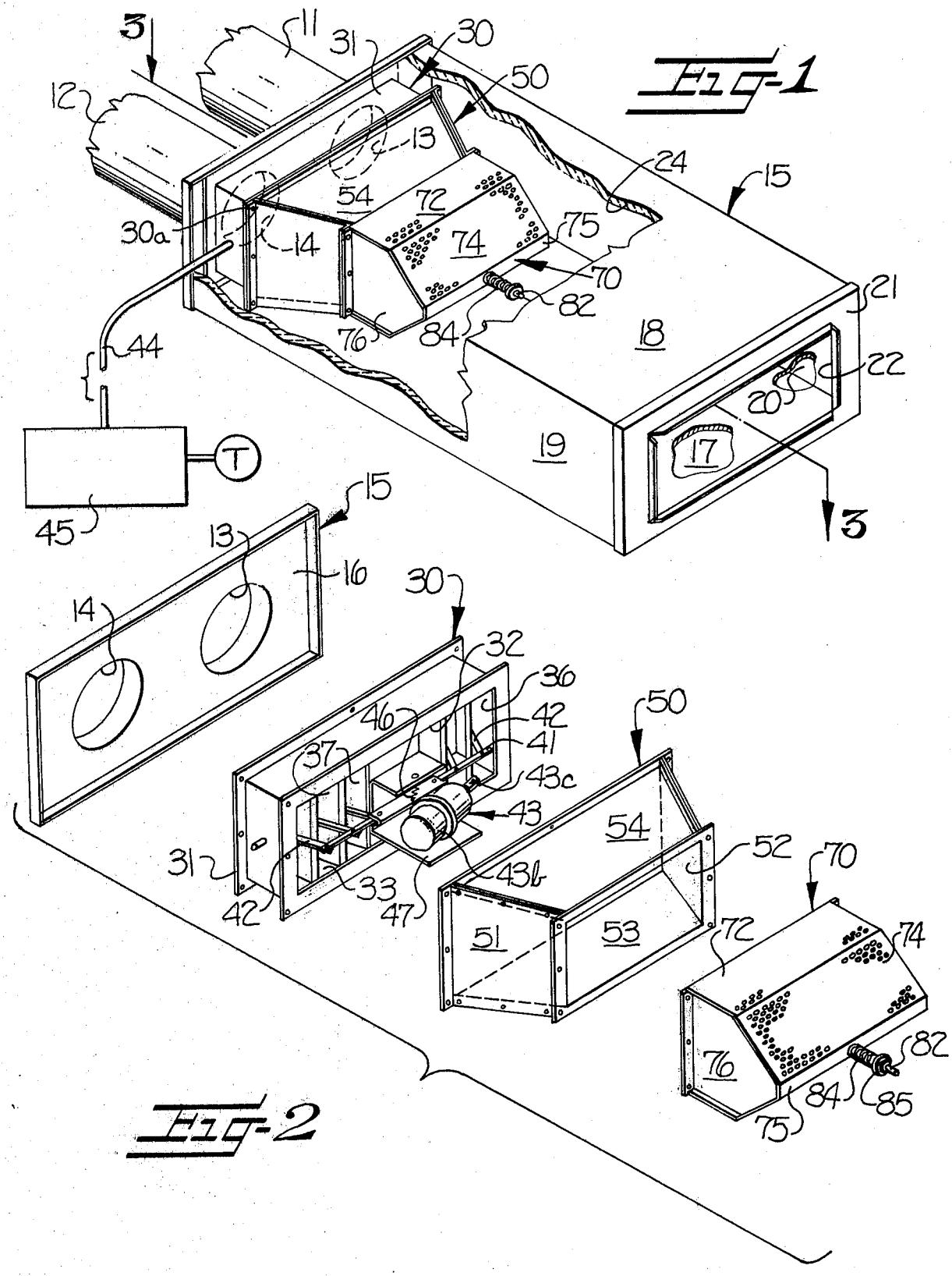

COMPACT CONTROL UNIT FOR AIR DISTRIBUTING SYSTEMS

This invention relates to air distributing systems, and more especially, to an improved control unit for efficiently mixing airstreams of different characteristics to produce a composite airstream and for also effectively regulating the volume of the composite airstream flowing into a housing of the control unit.

It is well known in the prior art to provide air flow control units utilizing dampers or louvers for inducing the intimate mixture of airstreams in their course from separate inlets and thereby forming a composite airstream thereof, while utilizing some form of volume regulator for controlling the volume of air in such composite airstream flowing into an enclosure or room. Such prior art air flow control units have had various deficiencies in that various components thereof, such as air mixing valves and air volume regulators thereof, have been of complicated, intricate and bulky construction which not only contributed to problems attendant to the installation and maintenance of such components, but has also required that the overall air flow control unit be of undesirably bulky construction. Additionally, one of the critical problems encountered in the design and manufacture of the known prior art types of air flow control units resides in the fact that known forms of constant volume regulators are subjected to considerable vibrations produced during the flow of air therethrough, and the noises created by such vibrations are transmitted to the housing of the control unit. As is well-known, such housings are usually quite large as compared to the air volume regulator and thus have relatively large wall surfaces which, when vibrated by the vibrations being transmitted thereto from the air volume regulator, have an effect somewhat in the nature of a drum, which amplifies the noises created by the air volume regulator.

It is therefore a primary object of this invention to provide a control unit of the general type referred to above, but which is of relatively simple, compact and economical construction and substantially reduces the above and other problems attendant to the construction and operation of known prior art control units of this type.

It is a more specific object of this invention to provide a compact control unit for an air distributing system which includes a housing having opposing pairs of side walls and an end wall, with the end wall being provided with a pair of inlets for the flow of respective airstreams therethrough. An air mixing valve, a duct and an air volume regulator are successively arranged and interconnected for the flow of air therethrough and are positioned within the housing and out of contact with the opposing pairs of side walls of the housing. The air mixing valve is secured to and supported by the end wall of the housing and thus supports the duct and the air volume regulator interconnected therewith in out of contact relation with the side walls of the housing.

In normal use of the invention, the housing of the compact control unit is adapted to normally occupy a horizontal position when installed with the air distributing system, and the air mixing valve is cantilever-mounted on the aforementioned end wall and projects into the housing for mixing the airstreams from the air inlets. The duct and the air volume regulator also are supported in a cantilever manner by the air mixing valve. The duct is provided with walls convergingly arranged toward the air volume regulator and which define an expansion and mixing chamber for the airstreams emerging from the air mixing valve, and since the duct and the air volume regulator interconnected with the air mixing valve are supported in out of contact relation with the side walls of the housing, this dampens the vibrations produced during the flow of air through the air volume regulator to thereby reduce noises created thereby being transmitted to the housing of the control unit.

Some of the objects of the invention having been stated, other objects will appear as the description proceeds when taken in connection with the accompanying drawings, in which:

FIG. 1 is a perspective view of the improved control unit in association with air inlet conduits of an air distributing system, with portions of the control unit housing broken away, and showing associated control means for controlling operation of the air mixing valve of the control unit;

FIG. 2 is a partially exploded perspective view of the control unit of FIG. 1, omitting the side and front end walls of the housing thereof;

Figure 3:
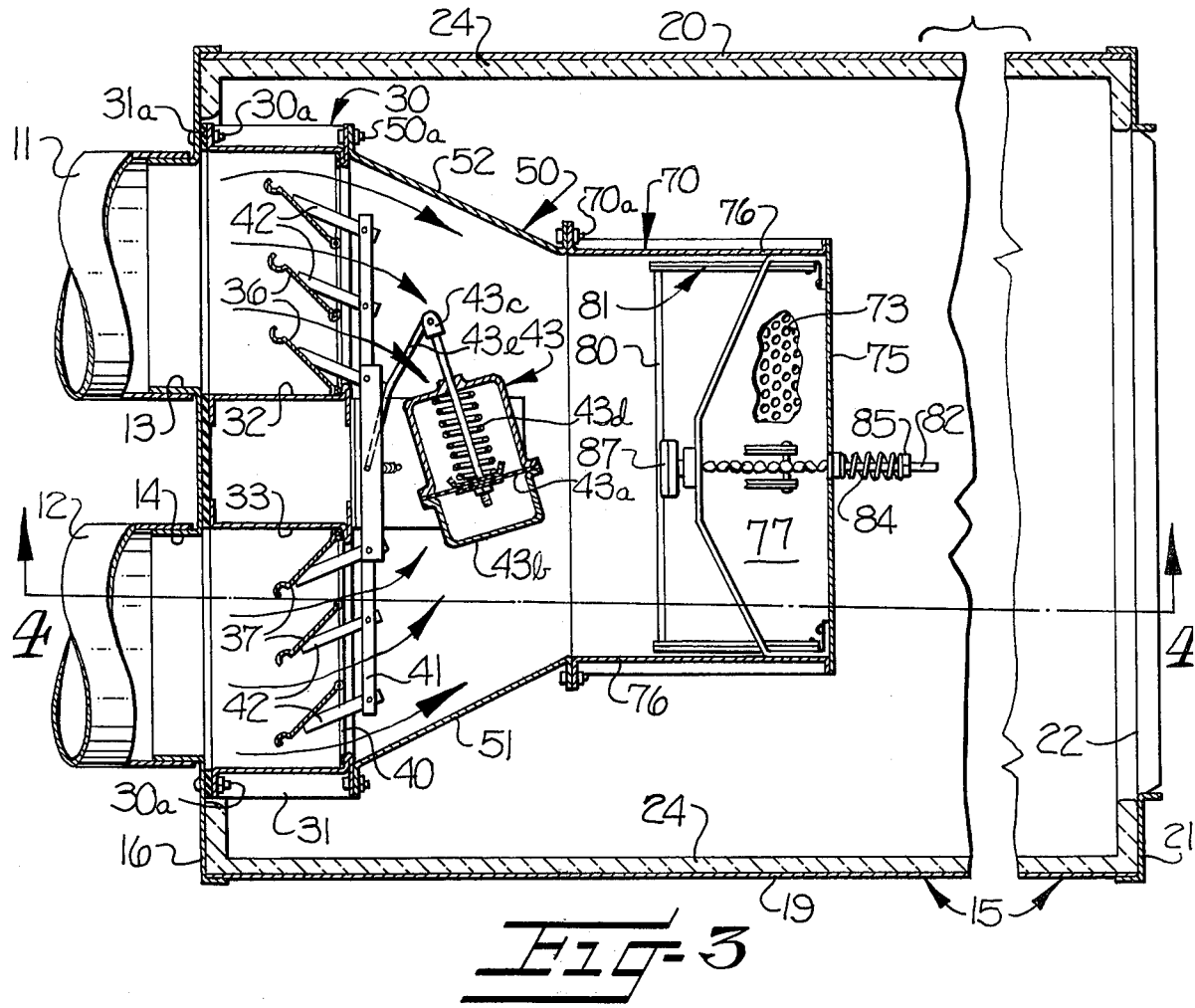
FIG. 3 is an enlarged sectional plan view taken substantially along line 3—3 in FIG. 1, with portions broken away.

Referring more specifically to the drawings, in the illustrative embodiment of the invention, as shown, the improved air flow control unit is adapted to occupy a substantially horizontal position in a high pressure or high velocity air distributing system represented by a pair of air inlet conduits 11, 12. These air inlet conduits 11, 12 direct respective airstreams of different characteristics; e.g., respective relatively warm and relatively cool airstreams, through respective inlets or openings 13, 14 through the rear or upstream wall of a main housing broadly designated at 15. As shown, housing 15 is of generally rectangular form and may be constructed of sheet metal or other relatively thin material.

The aforementioned rear or upstream end wall of main housing is indicated at 16, and housing 15 also includes opposing pairs of side walls 17, 18 and 19, 20 and a front or egress end wall 21. In this instance, walls 17, 18 are the respective bottom and top walls of housing 15. The various side walls 17—20 and end wall 21 may be provided with any desired number of air outlet openings therein, or if desired, a single outlet opening may be provided in any one or more of the walls 17–21. By way of example, the front end wall 21 is provided with a substantially rectangular outlet or opening 22 therethrough which may communicate directly with an enclosure or room to be air conditioned or to which other outlet conduits may be communicatively connected, as is well known. As is conventional, the inner surfaces of the relatively thin walls 16–21 of housing 15 may be provided with a layer or sheets of suitable thermal insulation or sound absorbing material 24 thereon.

According to the invention, there is compactly positioned within housing 15 an air mixing valve, a duct and an air volume regulator which are respectively broadly designated at 30, 50, 70 and are successively arranged and interconnected for the flow of air therethrough. As will be later described more in detail, air mixing valve 30, duct 50 and volume regulator 70 are positioned out of contact with opposing pairs of the side walls 17, 18 and 19, 20 of housing 15. Also, the air mixing valve 30 is secured to and supported by the rear end wall 16 of housing 15, to in turn, support duct 50, and air volume regulator 70 interconnected therewith in out of contact relation with side walls 17–20 of housing 15. Such arrangement of air mixing valve 30, duct 50 and air volume regulator 70 each of which may be considered as a module or sub-assembly, not only lends to the compactness of the entire assembly or control unit, but also serves to dampen the vibrations produced during the flow of air through air volume regulator 70 and to thereby avoid noises created thereby being transmitted to housing 15.

Air mixing valve 30 is of a type which is effective to mix the airstream entering housing 15 through inlets 13, 14 while varying the volume of the airstreams with respect to each other to obtain a composite airstream of the desired predetermined characteristics; e.g., temperature. In its preferred embodiment, air mixing valve 30 is shown as being of a type such as is disclosed and claimed in my co-pending application Ser. No. 438,570, filed concurrently herewith, and entitled MIXING VALVE FOR AIR DISTRIBUTING SYSTEMS, the disclosure of which is incorporated herein by way of reference. Accordingly, only so much of air mixing valve 30 will be described as is necessary to a clear understanding of the present invention.

As shown, air mixing valve 30 comprises a substantially rectangular frame 31 defining a housing having a pair of first and second air passags 32, 33 therethrough, preferably positioned in side-by-side relation and communicating with the respective inlets 13, 14 in the rear wall 16 of housing 15. A pair of louver means or flow control valves in the form of a pair of respective first and second groups of louver blades 36, 37 are provided in the respective passages 32, 33 of air mixing valve 30. Each of the blades 36, 37 preferably is formed of a relatively thin sheet metal or other sheet material and is of substantially rectangular configuration with corresponding longitudinal edge portions thereof being pivotally or hingedly mounted on opposite side walls of the respective passages 32, 33.

Figure 4:
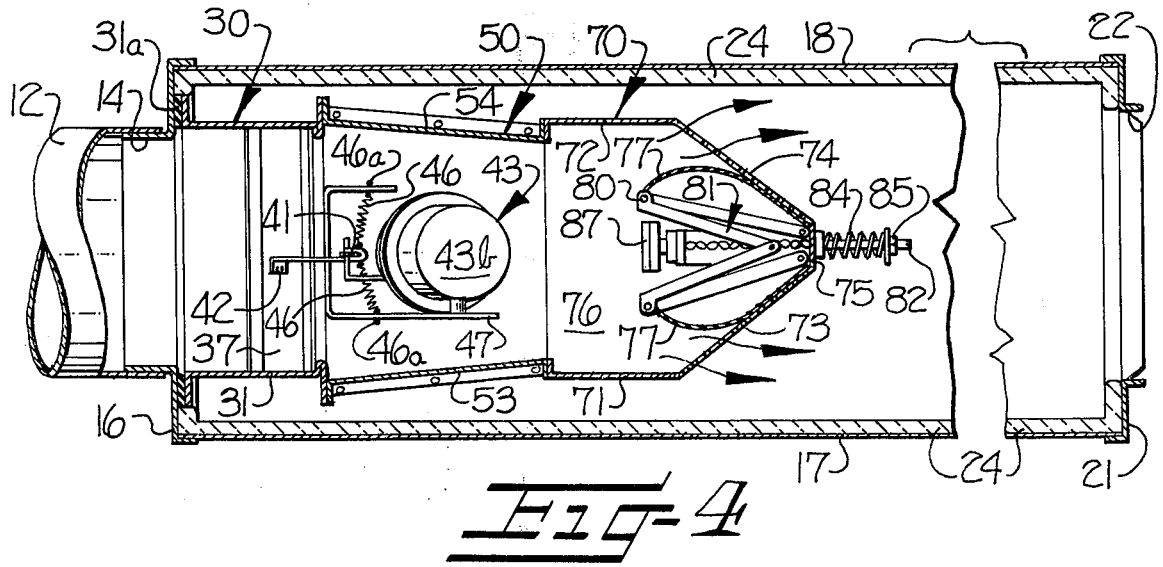
FIG. 4 is a longitudinal vertical sectional view taken substantially along line 4—4 in FIG. 3.

As shown in FIGS. 3 and 4, and as is preferred, the axes of all of the louver blades 36, 37 are positioned in a row in spaced substantially parallel relation to each other closely adjacent the egress or downstream ends of passages 32, 33. Also, at the egress or front ends of the substantially rectangular passages 32, 33, the four side walls defining the perimeters of the passages 32, 33 are provided with suitable resilient sealing means or gaskets 40 (FIG. 3) arranged to receive the end edges of the body portions of the blades 36, 37 in sealing engagement thereagainst whenever any of the blades 36, 37 occupy fully closed positions. As shown in FIG. 3, the blades 36, 37 occupy predetermined intermediate positions about halfway between open and closed positions thereof and an elongate operating member or arm 41 occupies an intermediate or neutral position. Operating member 41 may be of elongate one-piece construction or, as shown, it may be of built-up articulated construction. Operating member 41 is common to and is positioned outwardly and downstream of the egress ends of the front openings of both of the first and second air passages 32, 33 in frame 31. Thus, operating member 41 is positioned to extend across and outwardly of the pivotal axes of both of the groups of louver blades 36, 37.

A connector bar 42 is suitably secured to or fixed to a central portion of each blade 36, 37 adjacent the free longitudinal edge thereof, and the outer or front portion of each bar 42 is pivotally connected to operating member 41. Thus, since a pivotal motion is imparted to each connector bar 42 in the same general direction relative to operating member 41 during longitudinal movement thereof in a given direction, any time that operating member 41 is moved longitudinally in one direction, all of the louver blades 36, 37 are pivoted in the same direction with respect to each other. However, the louver blades of one group move toward an open position as the louver blades of the other group move toward a closed position, and vice versa, with respect to the egress ends of the respective passages 32, 33. In other words, whenever louver blades 36 are moved toward closed position incidental to movement of operating member 41 toward the bottom of the view in FIG. 3, louver blades 37 are moved toward open position. Conversely, when blades 37 are moved toward closed position incidental to movement of operating member 41 toward the top of the view in FIG. 3, the louver blades 36 then are moved toward open position.

As shown in FIGS. 3 and 4, a motive means 43 is operatively connected to operating member 41 for imparting movement thereto and, thus, to the groups of louver blades 36, 37. Accordingly, by way of example, it will be observed in FIGS. 3 and 4 that motive means 43 is embodied in a pneumatic operator utilizing a diaphragm 43a within a motor housing or cylinder 43b, and which diaphragm moves in response to air pressure or vacuum to impart linear or longitudinal movements to a plunger 43c projecting from one end of motor housing 43b.

Plunger 43c may be moved in one direction by a compression spring 43d and it may be moved in the opposite direction by fluid pressure entering cylinder 43b through a conduit 44 (FIG. 1) connected to a suitable control device 45. Control device 45 may be of any suitable type responsive to varying ambient air conditions, such as temperature variations, in housing 15 or in an adjacent enclosure or room for controlling the flow of fluid pressure into and out of cylinder 43b. Motive means 43 may be in the form of an electrically operable motor, or a double-acting fluid operated cylinder, or it may take other forms well-known in the art. Accordingly, a further description thereof is deemed unnecessary. It is important to note, however, that motive means 43 is compactly arranged with respect to the frame 31 of air mixing valve 30 in that it is positioned immediately forwardly of or downstream of frame 31 so as to be entirely enclosed within duct 50. Duct 50 preferably is relatively short to further enhance the compactness of the entire assembly. The free end of the plunger 43c of motive means 43 has one end of a link 43e pivotally connected to the outer end thereof, and the other end of link 43e is pivotally connected to a medial portion of the elongate operating member 41.

It is to be noted that, since each blade 36, 37 is pivoted or hinged closely adjacent one of its longitudinal edges, when the blades of either group occupy a fully closed position, substantially the entire surface of one side of each of such closed louver blades then is subjected to the full force or static pressure of the airstream in the corresponding air passage impinging against the closed louver blades. This aids in effecting a substantially airtight seal between the respective groups of louver blades and the side walls at the egress end of the respective passage 32 or 33, as the case may be. Also, such seal is further enhanced by the gasket 40 and the relative rigidity of the pivoted longitudinal edges of the blades 36, 37 as well as nesting sealing engagement of the free ends of certain of the blades 36, 37 along the pivotal axes of and against adjacent longitudinal edge portions of the adjacent blades when the respective group of blades occupies closed position.

However, because of the fact that the airstream is impinging against any fully closed group of the blades 36 or 37, it is highly desirable to provide some form of means to aid in subsequently moving the corresponding closed group of blades in the opposite direction toward an open position so that the motive means need not necessarily be of relatively large size and high power and thus may be relatively small to lend to the economical construction and compact nature of the air mixing valve 30 as well as the entire control unit. Therefore, force applying means is provided in response to movement of either group of louver blades 36, 37 toward and into closed position for exerting an opposing force thereon which, in this instance, biases operating member 41 in the opposite direction from that in which it is being moved, for aiding in subsequently moving the respective previously closed louver means in the opposite direction against the force of an airstream impinging thereon. To this end, and as disclosed in said copending application, a pair of tension springs 46 is provided whose proximal ends are connected to opposite sides of operating member 41, and whose distal ends are suitably anchored to the frame 31 at stationary points.

In this instance, frame 31 is provided with a generally L-shaped bracket 47 (FIG. 4) on the outwardly extending leg of which the housing 43b of motive means 43 is suitably mounted. The distal ends of tension springs 46 are suitably connected to the L-shaped bracket 47, as at 46a in FIG. 4. Accordingly, the stationary points 46a to which the distal ends of tension springs 46 are anchored are so positioned that each of the tension springs 46 extends substantially normal to the elongate operating member 41 when the same occupies the aforementioned neutral position thereof with the louver blades 36, 37 occupying the intermediate positions of FIG. 3. Thus, as operating member 41 is being moved longitudinally out of its neutral position in either direction, it follows that springs 46 are stretched by operating member 41 to thereby exert opposing force on operating member 41.

From the foregoing description, it is apparent that, when the louver blades 36, 37 occupy the neutral or intermediate position shown in FIG. 3, or any time during which both groups of louver blades 36, 37 occupy at least partially open positions, the airstreams entering the passages 32, 33 through the inlet conduits 11, 12 will be directed into converging relationship by the groups of blades 36, 37 as such airstreams flow into duct 50. Thus, duct 50 serves as an air expansion and mixing chamber and an intimate intermixture of the respective airstreams is effected immediately upon the airstreams passing from passages 32, 33 into duct 50.

As best shown in FIG. 3, the frame 31 of air mixing valve 30 is suitably secured to the rear end wall 16 of housing 15, as by means of bolts 30a. The duct 50, which is preferably substantially rectangular in cross-section, also is suitably secured to the front surface of the substantially rectangular frame 31 of air mixing valve 30, adjacent the perimeter thereof, by any suitable means such as bolts 50a. The rear end portion of air volume regulator 70 also is substantially rectangular in cross-section and is suitably secured to the front end of duct 50, as by bolts 70a.

It is preferred that the length and width of the open rear or air-ingress end of air volume regulator 70 is substantially less than the length and width of the housing defined by the frame 31 of air mixing valve 30. Accordingly, duct 50 is formed of opposing pairs of side walls 51, 52 and 53, 54 which are convergingly arranged toward air volume regulator 70 to define the expansion and mixing chamber therewithin for the airstreams emerging from air mixing valve 30. Thus, the high pressure air from inlet conduits 11, 12 is mixed and expanded to fill the volume regulator 70 to facilitate uniform operation thereof.

Volume regulator 70 may take various forms and, by way of example, the volume regulator 70 is shown as a form of constant volume regulator comprising a housing formed of any suitable sheet material, such as aluminum or steel, and having opposed parallel generally rectangular side or lower and upper walls 71, 72 extending from the inlet of the housing and forwardly for a relatively short distance. Inclined, forwardly converging perforate side walls 73, 74 extend from the forward edge portions of the walls 71, 72 with the front edge portions of the converging side walls 73, 74 being connected to a relatively narrow elongate front end wall 75. The inclined walls 73, 74 are perforate so that the composite airstream formed in the duct 50 may flow through the perforate walls 73, 74 and into the housing 15. Opposite sides of regulator 70 are closed by respective side walls 76.

As shown in FIGS. 3 and 4, a pair of curtain means 77 of flexible imperforate material are attached within regulator 70 to the inner surface of the front end wall 75 thereof. Curtain means 77 extend rearwardly from wall 75 a sufficient distance to cover the respective perforate converging walls 73, 74. The free or rear ends of the pair of curtain means 77 are fixed to a pair of parallel rod means 80. Rod means 80 are connected, by suitable linkage generally designated at 81, to a centrally located longitudinally reciprocable shaft 82 within volume regulator 70 and loosely penetrating the front end wall 75.

Suitable compression spring means 84 is provided surrounding the outer exposed end portion of shaft 82 and a lock nut 85 is threaded on the outer end of shaft 82 for serving as an adjustable abutment for spring means 84. Spring means 84 thus biases shaft 82 forwardly and, through linkages 81, biases the pair of curtain means 77 toward each other and away from walls 73, 74 to an open position. As illustrated, linkage 81 also includes dampening means 87 of a well-known type for reducing vibrations and substantially preventing fluttering of curtain means 77 when pressurized air impinges thereagainst. For more detailed disclosures of air volume regulators of the type described herein, reference is made to Werder U.S. Pat. No. 2,890,716, issued June 16, 1959; Waterfill U.S. Pat. No. 3,000,395, issued Sept. 19, 1961; Waterfill U.S. Pat. No. 3,060,960, issued Oct. 30, 1962; Smith U.S. Pat. No. 3,394,769, issued July 30, 1968; and Smith U.S. Pat.

No. 3,425,443, issued Feb. 4, 1969. The aforementioned patents are directed to various aspects of air volume regulators of the type heretofore described and accordingly a further more detailed description thereof is deemed unnecessary.

As indicated earlier herein, due to the high velocity and pressure of the air flowing through the volume regulator 70, and even though the dampening means 87 aids in reducing such vibrations to some degree, the noises created by the vibrations of the air volume regulators in the known prior art have been transmitted directly to the housings and, especially, to the adjacent relatively large walls of the corresponding housings because the air volume regulators of the prior art have been connected to the adjacent walls of the housings within which they were positioned heretofore. This also has caused the opposing pairs of side walls of such prior art housings to vibrate to a substantial degree and function somewhat in the manner of a head of a drum to thereby amplify and further aggravate the noises created by the vibrations of the air volume regulator. According to the present invention, however, it will be noted that only the rear end of the air mixing valve 30 is secured to a portion of the main housing 15; i.e., the rear end wall 16 thereof. Also, it is to be noted that the rear end of duct 50 is secured to the front end of the frame 31 of air mixing valve 30, and the rear end of the air volume regulator 70 is secured to the front end of the duct 50. Thus, duct 50 is positioned out of contact with housing 15 and is cantilever-mounted on the outlet or front end of air mixing valve 30, and air volume regulator 70 also is positioned out of contact with housing 15 and is cantilever-mounted on the outlet end or front end of duct 50 for controlling the volume of air flowing therethrough. Suitable air seals or resilient gaskets, not shown, may be provided between the flanges of duct 50 and the adjacent ends of air mixing valve 30 and volume regulator 70, if desired. Also, a similar gasket 31a (FIGS. 3 and 4) may be provided between frame 31 and rear end wall 16 of main housing 15.

By providing the duct 50 between the front end of air mixing valve 30 and the rear end of air volume regulator 70, the vibrations imparted to the air volume regulator 70 by the flow of air therethrough and the action of the curtain means 77 are transmitted to, but absorbed and dampened to a substantial degree by, the duct 50. Such vibrations are even further reduced and dampened by the mass of housing or frame 31 of air mixing valve 30. Thus, minimal vibrations are transmitted from the housing of the air volume regulator 70 to the walls of main housing 15. Actual tests have determined that the duct 50 has reduced previous noise levels of about 65 decibels to about 54–56 decibels; a reduction of 9–11 decibels. In view of reduction of each three decibels reducing sound power by about 50%, it is apparent that the noise levels have been significantly reduced by this invention.

Actual tests also have indicated that it is desirable to utilize a duct 50 which is at least about 6 inches long, although it is apparent that the length of the duct in the direction of flow of the air therethrough may be longer and the optimum length thereof may vary in accordance with the type and thickness of the material forming the walls of duct 50.

It is apparent that, from an economical standpoint, the walls of duct 50 might be made from sheet aluminum or sheet steel and thus should be as thin as possible while being of the desired strength and capable of properly supporting the air volume regulator 70 and to substantially absorb and dampen the vibrations being produced at the air volume regulator by the high velocity, high pressure air flowing therethrough. With the above considerations in mind, it has been found desirable that the sidewalls of duct 50 extend in converging relationship as shown in FIGS. 3 and 4 and that they be approximately 1/16th inch thick, with the length of the duct 50 measured parallel to the flow of the air therethrough being approximately 6 inches. It has been found that the duct 50 should be at least about 6 inches long to provide a highly effective dampening effect upon the vibrations produced by the flow of air through the air volume regulator 70.

In the drawings and specification, there has been set forth a preferred embodiment of the invention, and although specific terms are employed, they are used in a generic and descriptive sense only and not for purposes of limitation.

That which is claimed is:

1. A compact control unit for an air distributing system comprising a housing having opposing pairs of side walls and an end wall, said end wall having a pair of air inlets for the flow of respective airstreams therethrough, an air mixing valve and a duct and an air volume regulator successively arranged and interconnected for the flow of air therethrough and each being positioned within said housing and out of contact with said opposing pairs of side walls of said housing, said air mixing valve being secured to and supported by said end wall of said housing for receiving the respective airstreams from said pair of air inlets, and said duct having flanged opposited ends and a minimum length in the direction of air flow therethrough of about six inches and having one flanged end secured to the outlet side of said air mixing valve and having its other flanged end secured to said air volume regulator so as to support the regulator in said out of contact relation with the side walls of the housing and to dampen the vibrations produced during the flow of air through the air volume regulator and to thereby reduce noises created thereby being transmitted to said housing.

2. Apparatus according to claim 1, wherein said air mixing valve comprises a substantially rectangular frame defining a pair of air passages therethrough communicating with the respective air inlets in said end wall of said housing, motive means carried by said frame and positioned within said duct, a pair of groups of louver blades pivotally mounted in the respective air passages for controlling the flow of the airstreams therethrough, and means operatively connecting said motive means to said groups of louver blades for moving the same so that one group is moved toward an open position as the other group is moved toward a closed position and vice versa.

3. A compact control unit for an air distributing system comprising a housing having opposing pairs of side walls and an end wall, said end wall having a pair of air inlets for the flow of respective airstreams therethrough, an air mixing valve and a duct and an air volume regulator successively arranged and interconnected for the flow of air therethrough and each being positioned within said housing and out of contact with said opposing pairs of side walls of said housing, said air mixing valve being secured to and supported by said end wall of said housing for receiving the respective airstreams from said pair of inlets, and said duct having flanged opposite ends and a minimum length in the direction of air flow therethrough of about 6 inches and having one flanged end secured to the outlet side of said air mixing valve and having its other flanged end secured to said air volume regulator so as to support the regulator in said out of contact relation with the side walls of the housing and to dampen the vibrations produced during the flow of air through air volume regulator and to thereby reduce noises created thereby being transmitted to said housing, and said duct having walls convergingly arranged toward said air volume regulator and defining an expansion and mixing chamber for the airstreams emerging from the air mixing valve.

4. A compact control unit for an air distributing system comprising a housing having opposing pairs of side walls and an end wall, said end wall having a pair of air inlets for the flow of respective airstreams therethrough, said housing containing therein an air mixing valve and a duct and an air volume regulator successively arranged for the flow of air therethrough and fastened together in abutting relation and positioned out of contact with said opposing pairs of side walls of said housing, said air mixing valve including a frame defining a housing having a pair of air passages therethrough and communicating with the respective pair of inlets, and a pair of groups of louver blades carried by said frame and positioned in the respective air passages for mixing and controlling the volume of the respective airstreams emerging from said pair of air passages, motive means operatively connected to said pair of groups of louver blades for moving the same so that one group of louver blades is moved toward an open position as the other group of louver blades is moved toward a closed position and vice versa, means responsive to movement of either group of louver blades toward and into closed position for exerting an opposing force thereon for aiding in subsequently moving the respective group of louver blades in the opposite direction against the force of an airstream impinging thereon, and said frame of said air mixing valve being secured to and supported by said end wall of said housing to, in turn, support said duct and said air volume regulator fastened together therewith in said out of contact relation with the side walls of the housing.

5. A compact control unit for an air distributing system including a housing having opposing pairs of side walls and an end wall, said end wall having a pair of air inlets for the flow of respective airstreams therethrough, an air mixing valve including a frame supported on said end wall and projecting into said housing out of contact with said opposing pairs of side walls thereof, said air mixing valve having a pair of air passages therethrough communicating with the respective air inlets and having respective louver blades therein arranged to direct the airstreams into converging relation as they emerge from said passages to induce mixing of the airstreams, an air volume regulator spaced downstream from said mixing valve and positioned within said housing and out of contact with said opposing pairs of side walls thereof and having a pair of opposing perforate walls and associated curtain means for controlling the volume of air emerging from said volume regulator into said housing, said volume regulator having an open air-ingress end, a duct having flanged opposite ends and a minimum length in the direction of air flow therethrough of about six inches and having one flanged end secured to said frame of said air mixing valve and having its other flanged end secured to said air-ingress end of said volume regulator for supporting said volume regulator, and said duct also being out of contact with the opposing pairs of walls of said housing and serving as an expansion and mixing chamber for the airstreams in their course therethrough from said mixing valve to said volume regulator and also serving to dampen the vibrations produced during the flow of air through the air volume regulator and to thereby reduce noises created thereby being transmitted to said housing.

6. A compact control unit for an air distributing system comprising a housing having opposing pairs of side walls and an end wall, said end wall having a pair of air inlets for the flow of respective airstreams therethrough, said housing containing therein an air mixing valve and a duct and an air volume regulator successively arranged for the flow of air therethrough and fastened together in abutting relation and each being positioned out of contact with said opposing pairs of side walls of said housing, said air mixing valve including a frame defining a housing having a pair of air passages therethrough and communicating with the respective pair of inlets, and a pair of groups of louver blades carried by said frame and positioned in the respective air passages for mixing and controlling the volume of the respective airstreams emerging from said pair of air passages, said frame of said air mixing valve being secured to and supported by said end wall of said housing, and said duct having flanged opposite ends and a minimum length in the direction of air flow therethrough of about 6 inches and having one flanged end secured to the outlet side of said air mixing valve and having its other flanged end secured to said air volume regulator so as to support the regulator in said out of contact relation with the side walls of the housing and to dampen the vibrations produced during the flow of air through the air volume regulator and to thereby reduced noises created thereby being transmitted to said housing.

\* \* \* \* \*